Patented Sept. 14, 1954

2,689,185

UNITED STATES PATENT OFFICE 2,689,185

CERAMIC DIELECTRIC HAVING A BASIS OF A DOUBLE TITANATE OF MAGNESIUM AND CALCIUM

Werner Soyck, Lauf, Germany, assignor to Compagnie Generale de Telegraphie Sans Fil, a corporation of France No Drawing. Application November 15, 1949, Serial No. 127,512

Claims priority, application France November 16, 1948

4 Claims. (Cl. 106—39)

For a number of technical applications efforts have been made for about fifteen years past to prepare ceramic dielectrics based on rutile, or on titanates exhibiting low losses, particularly with a view to their employment in the domain of high frequencies. In this way dielectrics have been successfully obtained the loss factor of which, at atmospheric temperature, is of the order of from 3 to 5 times $10^{-4}$. There are even two groups of titanates known which furnish, alone or in combination with other titanates, products presenting a still lower loss factor, of the order of only $1 \times 10^{-4}$. These are magnesium orthotitanate and strontium metatitanate.

The present invention concerns a new ceramic dielectric exhibiting exceedingly low losses at high frequency, lower even than those of the titanates of magnesium and strontium. This new dielectric consists essentially of a double titanate of magnesium and calcium obtained by starting from dolomite as the raw material and from lead titanate employed preferably as a flux.

The double titanate of magnesium and calcium on which the present invention is based is a well defined chemical compound, which corresponds to the molecular composition $MgO \cdot CaO \cdot TiO_2$. It is prepared, according to an essential feature of the invention, by starting from a mixture, in suitable proportions, of dolomite and titanic oxide, according to the normal process for obtaining ceramics. The use of dolomite, a chemical substance of the formula $MgO \cdot CaO \cdot (CO_2)_2$ is in fact of such a nature as to ensure completely the desired union between the two titanates, so as to permit of the formation of the double titanate.

Furthermore, in order to facilitate the preparation of a perfectly fluidtight ceramic substance, recourse is had to a flux which may advantageously be lead titanate, employed in a proportion less than from 14 to 15 per cent of the total mass of the materials utilised.

Thus one example of a mixture giving rise to a ceramic substance in accordance with the invention has the following composition by weight:

| | Percent |
|---|---|
| Dolomite | 62.5 |
| $TiO_2$ | 30.0 |
| $Pb_3O_4$ | 7.5 |

This mixture, baked at about 1300 degrees centigrade, furnishes a perfectly fluidtight product, exhibiting a dielectric constant of the order of 100, with a temperature coefficient of about $-1{,}200 \cdot 10^{-6}$ per degree centigrade. On the other hand the dielectric losses of the product obtained are too low to be capable of being measured with precision; and in any case the loss factor is certainly lower than $0.5 \times 10^{-4}$ at atmospheric temperature.

The formation of a double ditanate of magnesium and calcium does in fact result from the use of dolomite as the raw material. If instead of dolomite a start is made from an initial mixture of calcium oxide and magnesium oxide taken in a suitable proportion (or from a mixture of the corresponding carbonates), a ceramic substance is indeed obtained, but the latter has a dielectric constant of the order of 70 only (instead of 100), and furthermore has a loss factor greater than $0.5 \times 10^{-4}$. The ceramic thus obtained presents itself in point of fact in the form of a mixture of the crystals of the three oxides MgO, CaO and $TiO_2$, and not in the form of the union of the double titanate contemplated.

I claim:

1. A process for the preparation of ceramic dielectric articles having very low dielectric losses at high frequencies comprising the steps of mixing dolomite and titanium dioxide in proportions suitable to form a double titanate of magnesium and calcium, adding a fluxing agent in an amount not exceeding 15 per cent of the total weight of the mixture, and firing said mixture at a temperature of about 1300° C., the amount of said fluxing agent being sufficient to provide for vitrification of the ceramic at said temperature.

2. A process for the preparation of a ceramic dielectric exhibiting very low dielectric losses at high frequencies, having a basis of a double titanate of calcium and magnesium, consisting in subjecting to a firing operation at a temperature of about 1300° C. a mixture composed of dolomite and titanium oxide in suitable proportions to form a double titanate of magnesium and calcium $MgO \cdot CaO \cdot TiO_2$, and lead oxide $Pb_3O_4$, which is converted into lead titanate in the course of the firing operation, the proportion of the said lead titanate being sufficient to provide for vitrification of the ceramic at said temperature and less than 15 per cent of the total weight thereof.

3. A process for the preparation of a ceramic dielectric exhibiting very low dielectric losses at high frequencies, having a basis of a double titanate of calcium and magnesium, consisting in subjecting to a firing operation at a temperature of about 1300 degrees centigrade a mixture composed of dolomite to the extent of about 62.5 per cent by weight, $TiO_2$ to the extent of about 30 per cent, and $Pb_3O_4$ to the extent of about 7.5 per cent.

4. A vitrified ceramic dielectric article containing as a major constituent a double titanate of magnesium and calcium of the formula $MgO \cdot CaO \cdot TiO_2$ and as a minor ingredient lead titanate in an amount not exceeding 15 per cent of the weight of the article.

References Cited in the file of this patent

UNITED STATES PATENTS

| Number | Name | Date |
|---|---|---|
| 1,843,427 | Lubowsky | Feb. 2, 1932 |
| 2,140,236 | Lederle et al. | Dec. 13, 1938 |
| 2,165,819 | Schonberg | July 11, 1939 |
| 2,166,221 | Patterson | July 18, 1939 |
| 2,213,168 | Monk et al. | Aug. 27, 1940 |
| 2,218,655 | Peterson | Oct. 22, 1940 |
| 2,473,960 | Kroger | June 21, 1949 |

FOREIGN PATENTS

| Number | Country | Date |
|---|---|---|
| 384,473 | Great Britain | Dec. 8, 1932 |
| 598,038 | Great Britain | Feb. 9, 1948 |
| 956,434 | France | Aug. 8, 1949 |

OTHER REFERENCES

Von Hippel: "Ind. and Eng. Chem.," vol. 38, pages 1097–1109 (1946).